United States Patent [19]

McLaughlin

[11] 4,016,856
[45] Apr. 12, 1977

[54] WIRE CUTTING MACHINE
[75] Inventor: Howard B. McLaughlin, Hollywood, Calif.
[73] Assignee: Laser Technology, Inc., N. Hollywood, Calif.
[22] Filed: Oct. 1, 1975
[21] Appl. No.: 618,519
[52] U.S. Cl. .............................. 125/21; 51/135 R; 83/820
[51] Int. Cl.$^2$ .......................................... B28D 1/08
[58] Field of Search ............. 51/135 R, 62; 125/21; 83/820

[56] References Cited
UNITED STATES PATENTS

| 2,843,917 | 7/1958 | Crane | 83/820 X |
| 2,866,448 | 12/1958 | Dessureau | 125/21 |
| 3,299,877 | 1/1967 | Grage | 125/21 |

Primary Examiner—Harold D. Whitehead
Attorney, Agent, or Firm—Poms, Smith, Lande & Glenny

[57] ABSTRACT

A machine for cutting a preselected shape in a work piece along X and Y axes, the machine utilizing a diamond wire cutting means traveling along a Z axis. A diamond wire cutting machine adapted for use with a milling machine. The cutting machine includes servo-driven caster-type pulleys movable about the Z axis and closely positioned above and below the work. Positioning of the rotatable pulleys is in accordance with the changes in configuration of the work being cut so that the diamond wire is directly supported against the pressure of the work as the work is turned in accordance with the pattern or shape to be cut.

4 Claims, 7 Drawing Figures

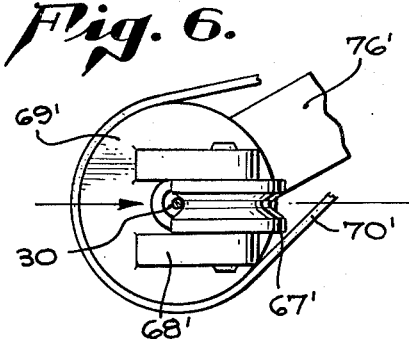
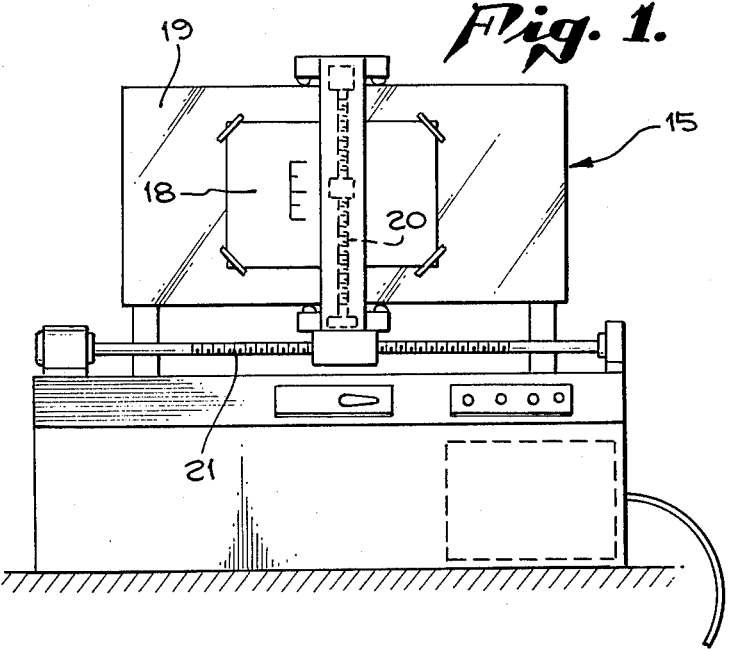
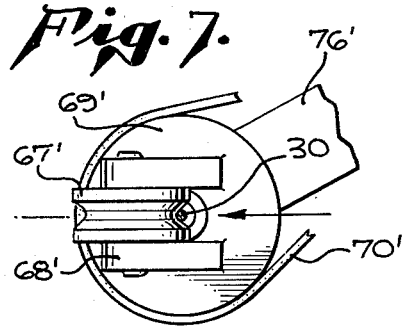
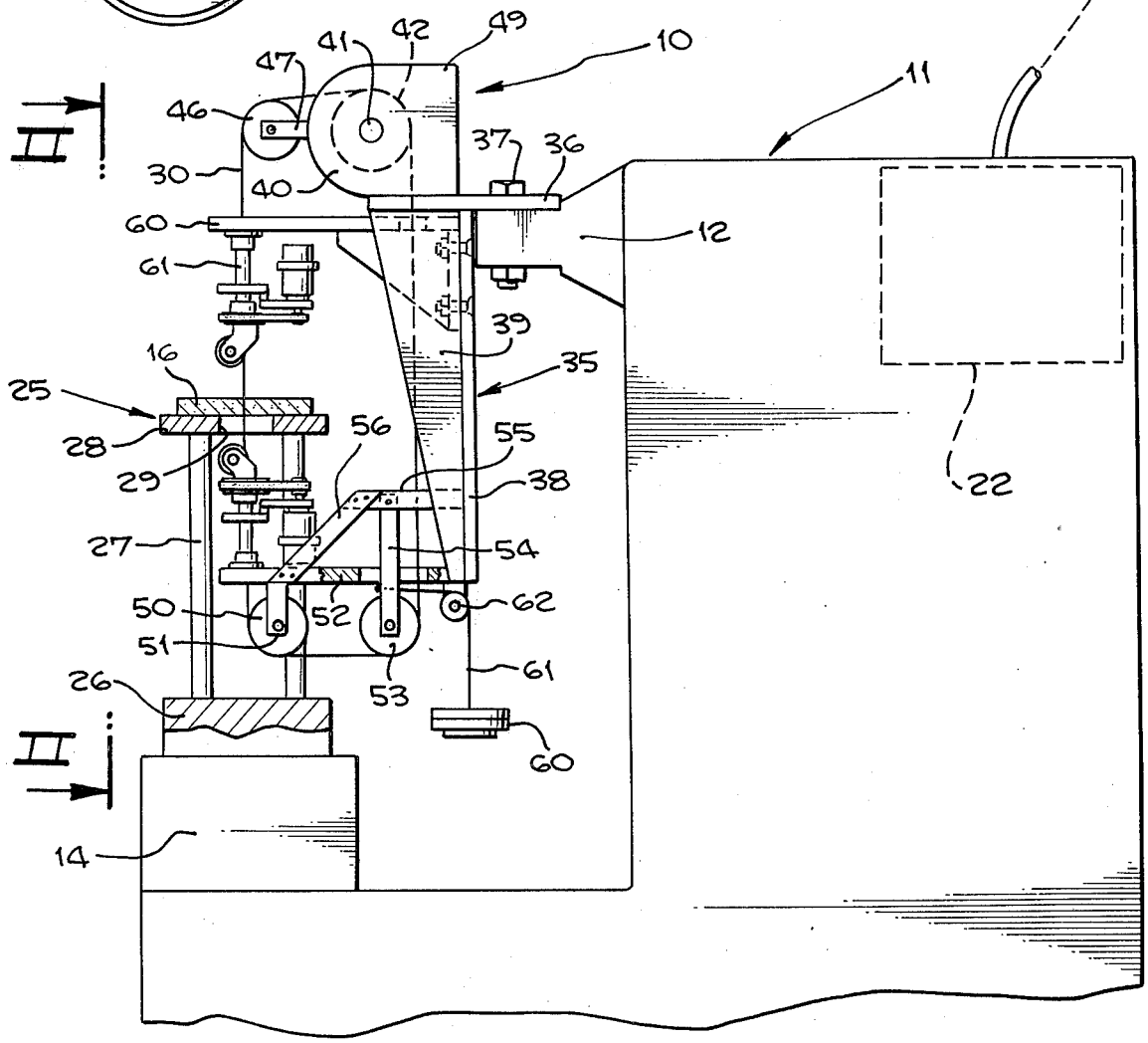

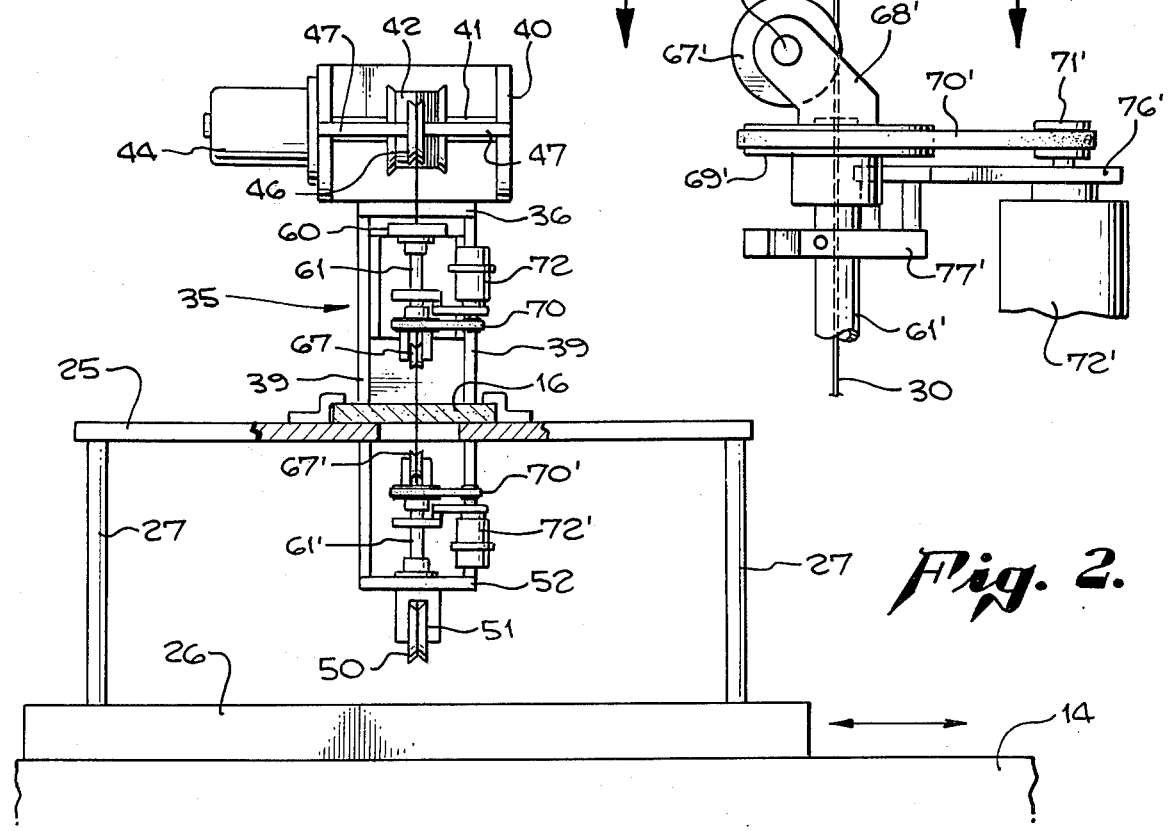

WIRE CUTTING MACHINE

BACKGROUND OF INVENTION

Diamond impregnated wire has been previously used for certain cutting operations in which the wire was run in a straight line and the work being cut was pressed against the wire in one direction only. Such prior diamond impregnated wire cutting machines were used to cut slices from various types of materials such as carbon and graphite compounds, tungsten and boron, fibers, paper and titanium honeycomb, gem stones, "moon rocks," and various materials having a hardness up to ten on the mohs scale for use in industrial research and development laboratories, production departments, semi-conductor factories, tube mills and tool plants. Such prior diamond impregnated wire included a wire core of high tensile strength, a matrix or coating of electrolytic copper on the wire core, and impregnation of the copper matrix with a diamond powder having a particle size in the range of from 6 to 100 microns depending upon the diameter of the wire. Diamond impregnated wire is available with diameters of 0.003 inches, 0.008 inches, and 0.0155 inches. The diamond particles may be made of synthetic or natural diamond material.

In prior proposed diamond wire cutting machines the diamond wire was guided through the cutting zone by a pair of pulleys disposed on opposite sides of the cutting zone. The wire was of fixed length, such as 100 feet, and was fastened to a single rotatable drum about which the wire was wound. The drum was provided axial movement so that the wire was fed from the drum and also fed onto the drum in virtually the same plane as the guide pulleys so that the wire would not be disposed at an angle to the guide pulleys and thereby cause rapid wear thereof. The rotatable wire carrying drum was driven by a reversable motor so that when the end of the wire was approached the motor would reverse the direction of rotation of the drum and the wire passing through the cutting zone would be reversed in direction but maintained under the same tension and the same cutting speed.

While diamond impregnated cutting wire has been used in such machines for making straight, smooth cuts with minimum loss of material and has been used in manually operated hack saw frames, use has not been made of diamond impregnated wire for cutting shapes having X, Y dimensions because change in laterally directed forces on the wire passing through the cutting zone caused the imposition of similarly directed forces on the guide pulleys which were fixed in position. Since the diamond impregnated wire was required to be at a selected tension and although the force of the work against the wire was sometimes very minimal, abnormal wear on the pulleys occured and in addition precise cutting of the work within acceptable tolerances was not practical. However, it is recognized that diamond impregnated cutting wire is capable of cutting work at any place along the circumference of the wire. The use of diamond impegnated cutting wire is therefore advantageous over cutting machines utilizing band saws or scroll-type saws.

SUMMARY OF INVENTION

The present invention therefore contemplates a diamond impregnated wire cutting machine which is capable of cutting in X, Y dimensions with the wire passing through the cutting zone in a Z dimension. The present invention contemplates such a wire cutting machine which is readily adaptable for use on milling machines of known construction.

The primary object of the present invention is to provide a diamond impregnated wire cutting machine adapted to cut preselected shapes involving X, and Y dimensions with precision accuracy and with resulting cut surfaces having a substantially finished characteristic.

An object of the invention is to provide a diamond impregnated wire cutting machine especially adapted for cutting shapes from solid materials, such shapes including punches and dies made of tool steel, as by cutting away unwanted metal parts to leave the selected shape of die or punch.

A further object of the invention is to disclose and provide a diamond impregnated wire cutting machine readily adapted for use on a standard milling machine and for use in connection with well known control means used with such milling machines such as punched tapes, line drawings, physical templates, and the like.

A more specific object of the present invention is to provide a diamond impregnated wire cutting machine wherein the wire passing through the cutting zone is effectively and properly supported in accordance with the shape of the cut being made and for lateral force changes occuring during the cut of a preselected shape having X, Y dimensions.

A still further object of the present invention is to provide a diamond impregnated wire cutting machine in which a pair of guide pulleys are turned about pivotal mountings in accordance with the preselected shape being cut.

A still further object of the present invention is to provide a machine as described above wherein the work may be fed into the wire or the wire may be fed into a fixed work specimen.

A specific object of the present invention is to provide in combination with a work table and a tool mount of a milling machine, an auxiliary table fixed to the milling machine work table to provide work support means, a frame fixed to said tool mount in operable relation with the auxiliry work table, a cutting means carried by the frame on the tool mount and including a diamond impregnated wire continuously movable in operable association with the auxiliary work table and at a cutting zone, and means to position and hold the diamond cutting wire in the cutting zone without lateral misalignment thereof while work is being fed along X and Y directions to the cutting zone. The invention contemplates that the diamond impregnated cutting wire in the cutting zone be supported by pivotally mounted servo-driven guide pulleys which move in a 180 degree out of phase relationship with respect to the movement of the work member along X, Y axes so that pressure of the work member against the wire is always directly opposed by such servo-driven guide pulleys.

Various other advantages and objects of the present invention will be readily apparent from the description of the drawings in which an exemplary embodiment of the invention is shown.

In The Drawings

FIG. 1 is a fragmentary partially schematic elevational view of a milling machine provided with a diamond impregnated wire cutting machine of the present invention, the milling machine being associated with a shape control means such as a "Linemaster" in which the shape is traced from a drawing.

FIG. 2 is a fragmentary elevational view taken from the plane indicated by line II—II of FIG. 1.

FIG. 3 is an enlarged fragmentary sectional view taken in a vertical plane passing through the cutting wire at the cutting zone.

FIG. 4 is a fragmentary plan view taken from the plane indicated by line IV—IV of FIG. 3.

FIG. 5 is a fragmentary view taken in the same plane illustrating the guide wheel in a position 180° from that of FIG. 4.

FIGS. 6 and 7 are fragmentary views taken in the same plane as FIG. 5 showing the positions of the guide wheels at 90° to the positions shown in FIGS. 4 and 5.

In the drawings a diamond impregnated wire cutting machine embodying this invention is generally indicated at 10. Machine 10 is cooperably mounted upon a milling machine generally indicated at 11, said milling machine having a tool mounting frame member 12 and a work table 14 controllably movable along X, Y dimensions or axes in well-known manner. Associated with milling machine 11 is a control means generally indicated at 15, said control means having information defining the selected shape or configuration to be cut from the work 16. This information is transmitted in well-known manner to the milling machine 11 and to the work table 14 which then proceeds along X and Y axes in accordance with the information to cut the selected shape.

Milling machine 11 is only generally indicated; the machine 11 may be any standard well-known type of milling machine. In this example the work table 14 is movable along X and Y axes; in other milling machines to which this invention may be adapted, the work table may be fixed and stationary and the tool holder 12 mounted for movement in X and Y dimensions.

Control means 15 in this example uses a line drawing 18 mounted upon a suitable transparent plate 19. A stylus, not shown, which precisely follows a line on the line drawing 18 is mounted for movement along a Y axis by feed screw means 20 and for movement along an X axis by feed screw means 21. The movement of the stylus is transmitted by the feed screw means 20 and 21 through well-known electrical means to a transducer component 22 mounted on the milling machine for transmitting the line positioned information to the work table 14 so that the work table moves in accordance therewith. Control means 15 may be of well-known make and manufacture, an example is the "Linemaster" made by Andrew Engineering Co. of Hopkins, Minn. The drawing 18 may be made on a mylar sheet. It will be understood that while this example has shown a control means 15, such as a "Linemaster," that other well-known control means presently in use on milling machines may also be used including numerical control systems, magnetic or paper tape systems, pantograph systems, and well-known template systems. When the term control means is used it will be understood that anyone of these systems may be used for controlling and transmitting motion to either a movable work table or a movable tool holder.

Diamond impregnated wire cutting machine 10 may be readily associated with milling machine 11 and comprises an auxiliary table means 25 supported and fixed to the milling machine work table 14. In this example, auxiliary table 25 comprises a base member 26 readily securable in fixed relation to the work table 14, upright columns 27 which support a selected distance above base member 26 a top plate 28 to which the work member 16 may be readily attached and fixed by well-known fastening means. Top plate 28 is provided with an enlarged through opening 29 providing passage of diamond impregnated wire 30 through the cutting zone defined by the space just above and below the work 16 when supported on top plate 28. It will be understood that other configurations of auxiliary work tables 25 may be employed, the purpose of the auxiliary work table 25 being to support the work 16 at a suitable selected height above the milling machine work table 14.

Cutting machine 10 also includes a cutting frame means 35 having a top frame member 36 adapted to be secured by suitable bolt and nut assemblies 37 to a shouldered surface on tool mount 12. Frame means 35 also includes a vertically disposed plate 38 depending from horizontal plate 36 and reinforced by depending gusset plates 39. Above top plate 36 is supported a generally cylindrical housing 40 provided with a horizontally and axially disposed shaft 41 upon which is mounted for rotation thereby a reel or drum 42 about which the diamond wire is wound and dispensed. Shaft 41 is rotatably driven by a reversable motor 44. As later described, the diamond impregnated wire 30 has both ends fixed to drum 42 and extends through the cutting machine in a closed loop so that when the wire is expended from the drum by turning in one direction and the end of the wire is reached, the rotation of the drum will be reversed. The wire is thus dispensed from the drum and taken up by the drum at the same time. Drum 42 is mounted for incremental axial movement during such rotation so that the wire being turned upon the drum and dispensed from the drum will always remain in virtually the same vertical plane.

Diamond impregnated wire 30 may be made of a material as previously described and generally comprises a high tensil strength wire core covered with a matrix of copper into which diamond particles varying from 6 microns to 100 microns may be imbedded, the particle size of the diamonds depending upon the diameter of the wire core. For example, if the wire is 0.003 inches, the size of the diamond particles may vary between 6 – 12 microns. Wire 0.008 inches in diameter may have diamond particles varying in size from about 30 to 60 microns. For a wire core having a diameter of 0.015, the particle size of the diamonds may vary between 75 to 100 microns. Such diamond wire is well known. Diamond wire has also been made out of nickel, beryllium, copper, stainless steel, and nichrome. Diamond particles may be placed directly into the material of the wire. Such wire has been used with other types of diamond impregnated wire cutting machines as described above.

Diamond wire which is wound upon the drum 42 is guided over a tip fixed pulley 46 rotatably supported from a pair of fixed arms 47 extending outwardly from the end frame plates 49 which support the drum 42. A fixed bottom guide pulley 50 is also rotatably supported from depending arms 51 carried by a frame extension 52 extending outwardly from the lower portion of the vertical plate 38. Adjacent and inboardly of the bottom fixed guide pulley 50 is an idle tensioning pulley 53 supported from suspension arms 54 pivotally mounted at 55 from upper members 56 of frame extension 52. Wire passing around the idle tensioning pulley 53 is then returned to the drum 42.

In this example, means for tensioning the diamond impregnated wire 30 includes preselected weight means 60 carried at the end of a cable 61 which is guided over a rotatably mounted pulley 62 and attached to the depending pivotally mounted arm 54. It will be apparent that wire 30 may be readily tensioned to a selected tension force by the weight means 60 and without displacement or distortion of the vertical plane defined by the top, back, bottom and front lays of the diamond wire 30.

Below top fixed pulley 38 a top horizontal frame member 60 supports beneath frame member 60 an elongated hollow tubular member 61 having its axis aligned with the path or axis of the wire 30 passing through the cutting zone so that wire 30 passes without interference coaxially of the tubular member 61 as shown in FIG. 3. Tubular member 61 may be suitably secured to the bottom surface of the frame member 60 by a suitable fitting 62 secured by screw bolts to frame member 60 and having a set screw 63 for securing member 61. At its lower end, tube 61 is provided with an annular recess 64 forming a seat for suitble bearing means 66 such as roller or needle bearings for rotatably mounting a wire guide pulley 67 carried on a caster arm means 68 secured to a drive wheel 69. The outer circumference of drive wheel 69 may be provided with axially extending serrations for interlocking frictional engagement with a drive belt 70 driven by a smaller diameter pinion 71 rotatably driven by a servo-drive means 72 provided with suitable connections 74 with the transducer 22 in the milling machine. The servo-drive means 72 may be supported from an arm 76 extending radially outwardly from the hub of drive wheel 69 and from a securement member 77 having a port 78 through which tubular member 61 extends and to which the securement member 77 may be secured in any suitable manner. The caster arm 68 laterally offsets the axis 80 of the guide and support pulley 67 so that the bottom of the groove of the pulley 67 is tangential to the wire 30 as it passes through the tubular member 61 and through the cutting zone.

Below the top plate 25 of the auxiliary work table a similar support and guide pulley arrangement is provided, and supported from the outboard end of the frame extension 52. Since the arrangement is similar to that described above, like parts will be given like reference numerals with a prime sign and since there is no difference in operation except that the tubular member 61' is upstanding instead of depending, a repetitious description is not made.

From a consideration of FIG. 3 it will be apparent that above and below the work piece 16 caster type pulleys 67, 67' are mounted so as to guidably support wire 30 as wire 30 passes axially through the tubular members 61, 61' and to minimize or eliminate lateral bending of wire 30 between the pulleys 67, 67' during cutting. It will be understood that the wire is tensioned to a suitable degree commensurate with the force of the work being fed against it so that lateral deflection of the wire 30 between the support pulley 67, 67' will not occur or will be minimized depending upon the work material being cut and the rapidity with which the cut is being made.

The servo-driving means 72, 72' associated with the transducer 22 through suitable connections 74, 74' will cause the caster driven pulleys 67, 67' to be turned about the axis of the wire 30 so that the pulleys will be aligned with the plane of the resultant pressure force being exerted against the work by the movable work table. In other words, the information fed from the sensing of the line drawing which information is transmitted to the work table to determine the movement of the work table along the X, Y axes, is also transmitted to the servo-driven members 72, 72' so that the caster mounted wire guide pulleys 67, 67' will be simultaneously and correspondingly turned or rotated about the Z axis so as to directly oppose forces bearing against the wire caused by corresponding movement of the work table and work member thereon.

In detail and referring to FIG. 1, the X, Y coordinates of the lines forming the drawing on drawings sheet 18 are sensed by the stylus type sensor of the control means 15. The X, Y positions of each successive point forming the line is transmitted by signal from the control means 15 to the transducer 22 where such signals are translated into actuation and controlled movement of work table 14 and auxiliary table 25 with the work member 16 fixed thereto. Thus work member 16 is caused to move along X, Y axes in accordance with the X, Y positions of points along a line being sensed by the stylus sensor on the drawing.

At the same time that the work member is responding to the changes in X, Y positions of points on a line on the drawing on control means 15, such point position information is also being transmitted from transducer 22 to the servo-driven members 72, 72'. Servo-driven members 72, 72' are in 180° out of phase relationship with the movement of the work piece 16 and both servo-rotated pulleys 67, 67' are correspondingly rotated and turned in accordance with such 180° out of phase relationship with the movement of the work member 16. Thus as the changes in shape or configuration occur as translated by the control means 15, both wire guide pulleys 67, 67' are rotated about the Z axis or the axis of the wire member 30 as it passes through the cutting zone to simultaneously and directly oppose the movement of the work member against the wire 30. Regardless of the shape being cut, servo-driven and positioned pulleys 67, 67' will always be positioned to oppose such movement and thereby support the diamond impregnated wire 30 in the cutting zone and restrict or reduce to a minimum any lateral displacement of the diamond impregnated wire in the cutting zone.

Diamond impregnated wire cutting of work members is capable of achieving tolerances of plus or minus 0.001 inches. Interior corners may be cut at radiuses of one half the diameter of the diamond impregnated wire being used as for example, a radius of 0.004 inches when a wire having an OD of 0.008 inches is used. Interior corners of such relatively small radius are desirable for certain work pieces and are difficult to obtain under usual standard milling machine practices.

A diamond impregnated wire cutting machine embodying the present invention is particularly useful in making punches and dies, the shape of the punch or die being precisely cut from the work material. It should be noted that in the use of a diamond impregnated wire cutting machine, there is an absence of cuttings normally made by a milling machine tool and the problems of disposal and control of such cuttings are avoided and eliminated by the cutting machine 10 of this invention. Machine 10 is also useful in cutting honeycomb wing structures because not only is the structure cut to a precise dimension but the cut edges of the honeycomb are cleanly cut and not frayed or ragged as when cut by presently known methods of cutting such honeycombed structure.

While machine 10 has been described with respect to a milling machine and used the X, Y movement of the milling machine work table, it will be understood that a work table having controlled X, Y movements may also be utilized in this invention. The mass and weight required of milling machines may not be required for cutting of some work pieces for which machine 10 would be particularly useful. It is also contemplated that more than one machine 10 may be associated with an elongated bed having a plurality of work tables moved in X, Y directions and under the same control means for producing a plurality of identical shapes or patterns at the same time.

It will be understood by those skilled in the art that various changes and modifications may be made in the diamond impregnated wire cutting machine adapted for use with an X, Y table, a milling machine, or other types of machines for cutting work pieces that may come within the spirit of this invention and all such changes and modifications coming within the scope of the appended claims are embraced thereby.

I claim:
1. A machine for cutting a preselected shape in a work piece and having an elongate wire cutting member defining a cutting axis and adapted to be associated with a work table and a tool support frame comprising in combination;
  means on the work table for holding a work piece in a cutting zone defined by said axis of said wire cutting member and for moving the work piece in X and Y directions relative to said cutting axis in accordance with a preselected shape;
  means on the frame for guiding the elongate wire cutting member in a Z direction through said cutting zone;
  said guiding means including elongated tubular members secured to said frame above and below the cutting zone of said work piece and rotatable grooved pulleys at ends of said tubular members adjacent the cutting zone of the work piece, the wire member passing through said tubular members and the bottom of the groove of the pulleys being tangential to the cutting zone axis;
  and means pivotally mounting each pulley between the cutting zone of said work piece and the end of its associated tubular member for supporting said wire member to minimize lateral deflection of said wire member at the cutting zone,
  said pivotal mounting means for each pulley including a drive wheel carried by said end of said associated tubular member and operably connected to a servo-drive means,
  support means for said servo-drive means on said associated tubular member,
  said servo-drive means and drive wheels associated therewith simultaneously and correspondingly turning said pulleys about the axis of said wire cutting member in accordance with the direction of movement of the work piece whereby said wire cutting member in the cutting zone is supported against lateral deflection of the wire member by the work piece.

2. In a machine as stated in claim 1 wherein said elongate cutting member is continuously movable;
  and tensioning means including a pivotally mounted suspension arm and pulley thereon for said elongate cutting member whereby the portion of the cutting member passing through the cutting zone is coaxial with the cutting zone axis.

3. In combination with a work table movable in X and Y directions and a cutting tool mount, the provision of;
  work support means fixed to the work table;
  a frame attachable to said cutting tool mount in operable relation with said work support means;
  cutting means carried by said tool mount and including a continuously movable diamond impregnated wire in operable association with said work support means at a cutting zone; and
  means for supporting and guiding said diamond cutting wire in said cutting zone and without lateral misalignment of said cutting wire while work is being fed to said cutting zone and against said cutting wire,
  said supporting and guiding means for said wire including coaxially aligned tubular members above and below said work support means and providing passagewayys for said wire,
  rotatable guide pulleys carried by adjacent ends of said tubular members between said ends of said tubular members and said work support means,
  said guide pulleys providing support points for said wire adjacent said work support means and being pivotally movable about the axis of said wire at the cutting zone to support said wire.

4. In a machine as stated in claim 3 wherein said support and guide means includes,
  means pivotally mounting said guide pulleys about the wire as a pivotal axis, said pivotal mounting means including an arm carried by said frame,
  servo-drive means on said arm,
  and means including a drive pulley and wheel on said tubular member connecting said servo-drive means with said guide pulleys for simultaneous operation of said guide pulleys with respect to the movement of said work table in said X and Y directions.

* * * * *